United States Patent [19]

Osborne

[11] 4,228,432

[45] Oct. 14, 1980

[54] RASTER SCAN GENERATOR FOR PLAN VIEW DISPLAY

[75] Inventor: Scott R. Osborne, Columbia, Md.

[73] Assignee: The United States of America as represented by the Secretary of the Navy, Washington, D.C.

[21] Appl. No.: 70,294

[22] Filed: Aug. 28, 1979

[51] Int. Cl.³ .............................................. G06F 3/53

[52] U.S. Cl. .................................. 340/736; 315/364; 315/378; 340/724; 340/727; 340/739; 340/744; 340/792; 364/521

[58] Field of Search ............... 340/724, 727, 744, 736, 340/739; 315/364, 378; 364/521

[56] References Cited

U.S. PATENT DOCUMENTS

| | | | |
|---|---|---|---|
| 3,422,419 | 1/1969 | Mathews et al. | 340/736 |
| 3,593,310 | 7/1971 | Kievit . | |
| 3,614,764 | 10/1971 | Kolb et al. . | |
| 3,629,841 | 12/1971 | Hare | 340/739 X |
| 3,747,087 | 7/1973 | Harrison et al. | 340/727 X |
| 3,772,677 | 11/1973 | Sommer | 340/739 X |
| 3,821,731 | 6/1974 | Levine . | |
| 3,870,922 | 3/1975 | Shutoh . | |
| 3,891,982 | 6/1975 | Cheek et al. . | |
| 3,925,765 | 12/1975 | Berwin et al. | 340/727 X |
| 3,971,011 | 7/1976 | Borchert | 340/736 |
| 3,979,742 | 9/1976 | Kolb et al. . | |
| 3,988,728 | 10/1976 | Inoue et al. . | |
| 4,011,556 | 3/1977 | Tochitani et al. . | |
| 4,127,850 | 11/1978 | Vallins | 340/727 X |

*Primary Examiner*—David L. Trafton
*Attorney, Agent, or Firm*—R. S. Sciascia; Paul S. Collignon

[57] ABSTRACT

A digital apparatus for generating a raster whose scan parameters can be altered and controlled by an external program. In addition to standard horizontal sweep, the raster can display a "waterfall" scan, range bearing sweep and various other geometrical patterns. A selector switch permits the raster scan unit to be selectively connected to either a computer or a control panel which provide the parameters for specifying any one raster.

6 Claims, 3 Drawing Figures

RASTER SCAN GENERATOR FOR PLAN VIEW DISPLAY

BACKGROUND OF THE INVENTION

The present invention relates to a raster scan unit for providing a flexible, controllable raster generator for a plan view display.

Most graphic display devices use a TV-scanning technique wherein the electron beam of a picture tube sequentially scans a screen from the upper to lower ends in accordance with a predetermined scanning pattern in order to simplify the deflection operation of the scanning beam of the tube. In order to provide greater versatility to graphic display devices, various modifications to raster patterns have been made. For example, in U.S. Pat. No. 3,988,728, entitled "Graphic Display Device" which issued Oct. 26, 1976, to Inoue et al, a pattern shifting device is described for shifting, on demand and in an amount selected by an external computer, the display of a pattern in a direction transverse to the direction of raster scanning.

SUMMARY OF THE INVENTION

The present invention relates to a raster scan generator which receives data and instructions from an external source, such as a computer. The values of ten parameters enter the raster scanning unit through an interface stage. Certain parameters are then entered into one of three elements: angle accumulator, a multiplier, and a position accumulator. In the angle accumulator, the angular displacement off the horizontal, $\theta_S$, of the first scan line is entered and converted into digital sine and cosine components. The line length R and velocity (trace speed) constant K are provided as inputs to the multiplier. The multiplier controls the incremental spacing of spots along the line displaced by angle $\theta_S$. $\delta x$ and $\delta y$ represent the orthogonal components of the spacing between successive spots on a line.

Following each scan line, a $\Delta x$ and $\Delta y$ value passes into the position accumulator and a $\Delta\theta$ value passes into the angle accumulator to up-date the starting position and orientation of the next line.

By varying the parameters, various scan patterns such as (1) the "waterfall" where, for example, oldest data occupying the lowest line on the raster is "pushed" down off the raster by the entry of a new data line at the top of the raster and (2) the "wheel of fortune" where $\Delta x$ and $\Delta y$ are held at zero and $\Delta\theta$ is held constant to produce the effect of a wedge rotating about its vertex can be achieved. Actually, the waterfall is produced by video inputs which are in synchronization with the raster.

It is therefore a general object of the present invention to provide digital apparatus for generating a raster whose scan parameters can be altered and controlled.

Other objects, advantages and novel features of the present invention will become apparent from the following detailed description of the invention when considered in conjunction with the accompanying drawing.

DESCRIPTION OF THE PREFERRED EMBODIMENT

Figure 1:
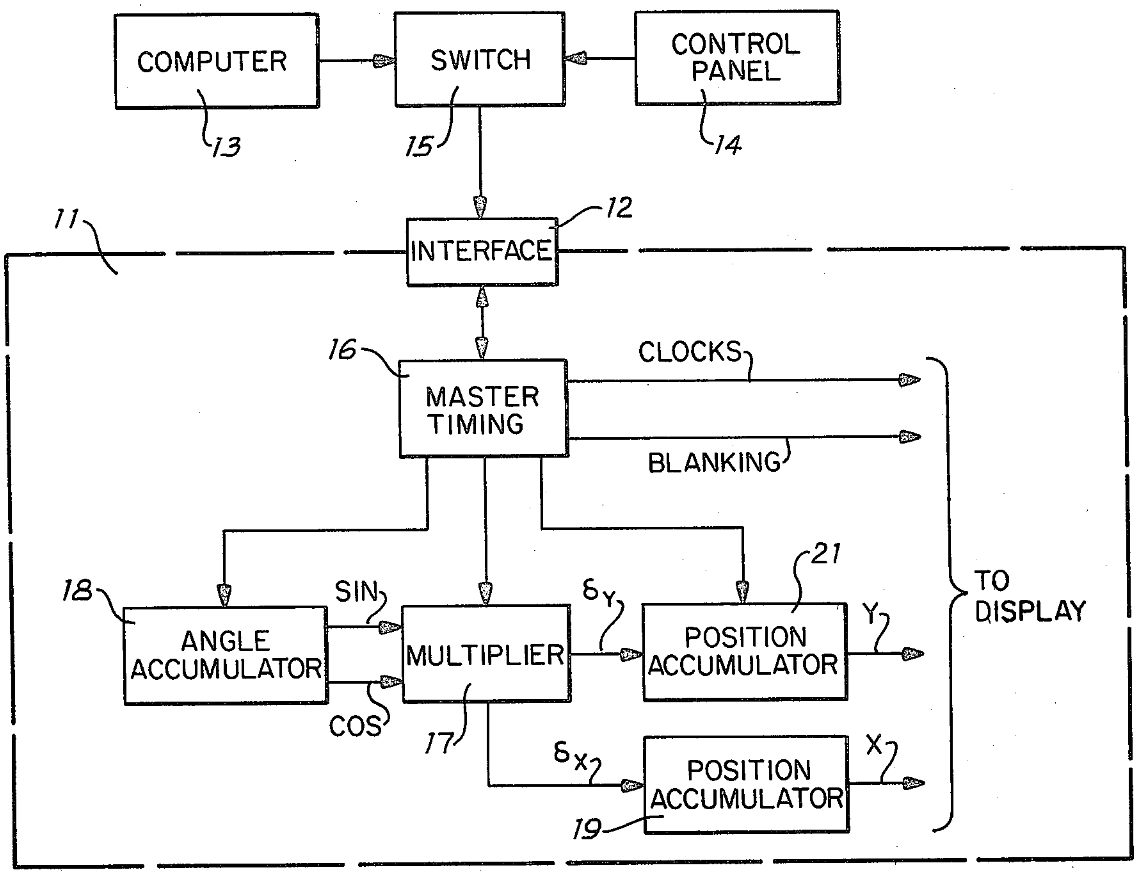
FIG. 1 is a block diagram showing a preferred embodiment of the present invention.

Referring now to the drawing, there is shown a raster scan unit 11 which is connected by an interface 12 to an external source. By way of example, the external source might be a computer 13, such as a Data General Corp. Nova 800 series computer, or a control panel 14 whereby parameters might be entered manually. A switch 15 is provided to select the mode for entering the parameters.

Computer control of the raster scan unit 11 permits several different formats of data display using one piece of hardware to generate the appropriate sweeps. The raster scan unit has ten parameters which are used to specify the raster. These parameters may either be entered manually through the control panel 14 or automatically via computer software/hardware. The parameters which are stored internally do not require to be re-initialized for every raster using the same parameters. Once the parameters have been specified, a "START" pulse initiates raster generation. The raster scan unit provides a "DONE" signal to notify (via interrupt) the computer program of the completion of a raster (including interlaced frames). The raster scan unit also provides blank/unblank controls, clocking and mode controls for the plan view display. All of the circuitry, save for the Nova mainframe, is contained on seven, 160-connector pin, SPS type 1C welded-wire boards.

There are ten parameters which are necessary to specify any one raster. These parameters are, according to parameter number:

| | |
|---|---|
| #0 - X starting position | ($X_S$) - 10 bits (Unipolar) |
| 1 - Y starting position | ($Y_S$) - 10 bits (Unipolar) |
| 2 - initial inclination | ($\Theta_S$) - 13 bits (BAMS) |
| 3 - inter-line x spacing | ($\Delta X$) - 16 bits (Sign/Magnitude) (Scaled 12) |
| 4 - inter-line Y spacing | ($\Delta Y$) - 16 bits (Sign/Magnitude) (Scaled 12) |
| 5 - incremental line rotation | ($\Delta\Theta$) - 8 bits (Sign/Magnitude) (BAMS) |
| 6 - number of lines minus 1 | (L) - 13 bits (Unipolar) |
| 7 - line length | (R) - 4 bits (Unipolar) |
| 8 - velocity constant | ($K_v$) - 7 bits (Unipolar) |
| 9 - interlace | (I) - 1 bit |

The parameters, $X_S$ & $Y_S$, specify the starting point of the first line of the raster on a $1024 \times 1024$ point matrix. The coordinate (0,0) is at the extreme lower-left side of the CRT while (1023, 1023) is at the extreme upper right part of the screen. $\theta_S$ specifies the angle of rotation of the first line of the raster. The parameters, $\Delta X$ and $\Delta Y$, specify the incremental X and Y spacing between the starting points of each line. Similarly, $\Delta\theta$ specifies the incremental rotation between each line in the raster. The line length, R, is related to physical dimensions by the equation $[(R+1)/16]*22''$, where R can have any positive integer value of zero through fifteen. The velocity constant, $K_v$, is specified such that if $K_v=0$, then the trace speed will be 25% of maximum. The equation used to calculate trace speed is $[K_v+32)/128]*100\%$, where $K_v$ is a positive integer from zero through 96.

The raster scan unit timing is generated by the master timing and control card 16. All timing pulses are generated from a random logic constructed micro-program.

The step counter can be considered the same as a program counter in that a set of functions is executed at a particular step and the program (step) counter is advanced (normally) upon the completion of that step. There are ten steps in the generation of a single raster. The step counter is set to "0" with the start pulse. Sequencing through the remaining steps is automatic and determined by various tests on conditions within each step, as hereinafter described.

The I/O Interface card 12 contains the circuitry necessary to transfer the parameter data to the appropriate registers via the 16-bit common I/O buss. There are two sources of parameter data i.e., the control panel 14 and the Nova mini computer 13, which are selected from the Computer/Manual Select switch (SPST) 15 located on the control panel. When the Computer/Manual Select switch 15 is on "manual" all of the parameters and controls originate from the control panel. This is accomplished by controlling the select inputs on six quad-two-bit multiplexers. The parameter number is generated using an SPST toggle switch (for the $2^3$ bit) and an eight position (octal) thumbwheel switch (for bits $2^2$, $2^1$ & $2^0$). There are sixteen SPST toggle switches, one for each bit, which serve as the source for the parameter data. When a parameter is to be loaded manually, the parameter number in octal (0–11$_8$) is selected. The data switches are set for the parameter value (in binary). When the "LOAD" button is depressed, the content of the data switches is transferred to the proper register via the common I/O buss. After the data has been transferred, the contents of the selected register will be displayed on 16 LED lamps above the data switches. The contents of any data register plus the N' register can be inspected without any interference of operation in the manual mode only. All data from either the panel 14 or computer 13 is transferred over the common I/O buss in positive logic. All data multiplexed onto the buss from the various data registers is negative logic. This scheme saves connector connections for the examine state, as only the active lines of a register need be gated onto the buss. Upon receipt of a "load" pulse either from the panel 14 or computer 13, the data register select enable controls are disabled, thus gating off all data multiplexed onto the buss from the data registers. At the same time the transfer data (from the panel switches or computer) is gated onto the buss. This condition is maintained for approximately 400 ns, during which a load-data-pulse is directed to the clock input of the appropriate data register. The load-data-pulse loads the transfer data into that register. After the 400 ns timing is complete, the data register select enable is reactivated and the transfer data gates are disabled. The data that were transferred to a register will be gated onto the common I/O buss and displayed in the LED lamps.

The timing circuit card 16 is used to generate all of the timing and sequencing signals necessary to generate a raster. No computations are performed on this board. It has the purpose to generate control and transfer control. Card 16 is a random logic, hard-wired micro-programmed timing generator which is capable of performing conditional transfers of control. The basic clock frequency is 20 MHz. This frequency is divided by two, then by two again to provide 10 MHz and 5 MHz clocks. The step counter consists of a decade counter (type SN74192) and a 1-of-10 decoder/demultiplexer (type 7442). The counter is cleared (to all 0's) by the start pulse to initiate a raster sequency. Similarly each step consists of a decade counter and 1-of-10 decoder to generate the appropriate timing signals. The step counter is incremented or changed (conditional transfer) by each step. However, it is not necessary for the step counter to initialize a step which occurs sequentially with another. For example, the critical timing sequence of loading and calculating the X,Y positions is always sequential.

Since the PRT or clock rate of position data to the plan view display is fixed at 300 ns, it is necessary to calculate the number of strokes needed to move the beam over the specified line length (R) with a fixed beam velocity ($K_v$). It was predetermined by using the maximum line length (22") and writing speed of the phosphor, that 86 strokes would be needed to generate a line at the maximum velocity constant ($K_v$). The number of strokes is calculated using a lookup table using $K_v$ as an address, multiplying by (R+1), scaling by $2^{-9}$ and rounding. The actual calculations are performed using the multiplier 17 in conjunction with peripheral circuitry on the angle accumulator 18 (sine/cosine board).

The multiplier 17 performs a 16×8 bit multiplication (unsigned) in about 1 μs. The integrated circuits used are of type SN74S274. Eight of these 4 bit×4 bit multipliers are used to form multiplier 17. The product is produced by using a Wallace-tree addition scheme on the sub-products of the individual multipliers. The outputs of each Wallace slice adder are then summed accordingly, using several half-adders and four-bit full adders.

There are three boards that perform the majority of the arithmetic of the raster scan unit. These are the angle-accumulator 18 (referred to as the SINE/COSINE board) the X-Accumulator 19 and the Y-Accumulator 21. Since the X-Accumulator and Y-Accumulator are identical, both shall be discussed simultaneously with the differences being presented at the appropriate point in the description. The similarity among the three accumulator boards is the use of a new type of LSI integrated circuit, SN74S281. The IC is a 4-bit binary accumulator with built-in shift matrix and arithmetic-logic unit (ALU). The shift matrix can perform shift-left/shift-right functions on the outputs of the ALU and serves as a latch to hold the matrix outputs on a positive ("0" to "1") transition of the clock. The ALU has two inputs, one of which is the matrix output and the other is an external 4-bit input. The ALU and shift matrix modes are controlled externally. For this application the mode of operation of the shift matrix is that of a latch (i.e., the matrix output is set to the ALU outputs upon a positive transition of the clock). The ALU can be controlled to perform many arithmetic and logic functions; however, the only functions necessary to perform the accumulation mode are F=A, F=B plus A, F=B minus A, and F=B, where B is the output of the shift matrix. The mode F=A is used to preset the accumulator by clocking the F output into the latch. The mode F=B allows the output of the shift matrix to appear at the F outputs. The modes of F=B plus A or F=B minus A are used in conjunction with the clock to perform the arithmetic functions. Although the SN74S281 provides a convenient means of implementing an accumulator, circuitry must be provided to place the correct data on the A input lines. For the job the accumulators perform in the raster scan unit, two input words are used by the accumulator. The first word is the initial value and the second is the increment. Logic circuitry is provided so that when a "load-accumulator" command is given, the initial value is multiplexed onto the A data input lines. When the command for "ADD" or "SUBTRACT" is given, the increment is placed on the A lines. The accumulator is loaded as follows:

(1) issue a load command (2) change ALU mode to F=A from F=B (3) select initial value using a multiplexer and place data on A inputs (4) wait for propagation delay (5) generate a clock (6) return ALU mode to F=B The F outputs will be the initial value as stored in the shift matrix. For the arithmetic modes all calculations are done in 2's compliment arithmetic, even though the increments have a sign/magnitude format. This is accomplished by using the SN74S281 to perform an addition or subtraction internally rather than doing an add or add compliment as is the case with full adders. This means that the magnitude of the increment can be used directly, with the ALU mode being determined by both the function to be performed (ADD or SUBTRACT) and the SIGN of the increment. For example, if the increment is negative and is to be added, use the mode F=B minus A; if the increment is positive and is to be subtracted use the mode F=B minus A and so on. There are three states the accumulator can have—the static (F=B), displaying the output of the shift matrix, arithmetic and preset. The SN74S281 can be cascaded to perform operations on longer word lengths. The longest word length used in the raster scan unit is 32 bits, which requires the use of 8 of the accumulator IC's in cascade.

The sine/cosine board 18 serves two purposes, i.e., to compute the angle of rotation (slope) of the successive lines in the raster and to calculate, using the multiplier 17, and a one quadrant sine lookup table, the incremental δx and δy values used to generate each line in the raster. The angle of rotation of each line is computed on a 13 bit binary angle measurement basis. An accumulator (16 bits) is used to generate each new slope using the initial condition $\theta_o$, and the increment $\Delta\theta$. The initial value of $\theta_o$ is preset into the accumulator at the beginning of each frame with the number of $\Delta\theta$'s added to this value being dependent upon the number of lines in the raster and whether or not the raster is interlaced.

The values of δx and δy are computed by using the output of the θ accumulator to an address to the sine/cosine lookup table. This table contains 2048 words of 15 bits each. The values stored in the table are a scaled, rounded binary value derived from the equation $$v_i = \frac{64}{86} * \frac{8191}{8192} * (\mathrm{SIN}\ \frac{2\pi}{8192} * i) * 32768$$

where i has integer values from 0 through 2047. Since only one quadrant of a sine table was used, logic circuitry was implemented to convert a four quadrant angle into a sign and single quadrant magnitude. It was also necessary to provide the complimentary angle since for two quadrants of the sine function, the table must be read through in reverse to obtain the correct value. The same arguments apply to the cosine calculations. The final value of δx and δy are computed as follows $$\delta x = v_c * R$$

$$\delta y = v_s * R$$

where $v_c$ and $v_s$ are values obtained from the lookup table. The values δx and δy are stored in the appropriate register on the X and Y accumulator boards.

The X and Y position accumulator boards 19 and 21 are identical so that a discussion of one describes both. There are two separate parts to the position calculator circuitry. One section calculates the starting position of each line; the other computes the position data, or sweep, within each line using the output of the first section as the initial position. The starting position accumulator uses the initial condition Xo (or Yo) as the preset value. Each subsequent starting position is generated by adding the incremental value, ΔX (or ΔY), to the previous position. The accumulator is preset at the beginning of each frame of the raster. The X position (or Y position) accumulator is loaded with the output of the X's (or Y's) accumulator at the beginning of each line. The generation of each line is accomplished by adding the correct number, N, of increments, using the value of δx (or δy) that was calculated prior to the generation of each line. The appropriate 13 bits of the position accumulator are used as inputs to $X_{out}$ ($Y_{out}$) register, as long as the position calculated lies within the displayable portion of the CRT, i.e., $0 \leq X \leq 1023$ or $0 \leq Y \leq 1023$. If X (or Y) is negative or exceeds 1023, the value is hardlimited to 0 if negative or 1023 if greater than 1023. This clipping is accomplished by selecting all 0's or all 1's, based on the sign and overflow bits of position accumulator.

Another function of the position accumulator card is to generate the blanking signal for the plan view display. At the beginning of each line the display is blanked and remains blanked during the initial backup/advance motion. After this, a "sequence unblank" is generated. An X unblank (or Y unblank) is generated the first time the sweep enters the valid display portion of the CRT. Both the X unblank and Y unblank signals are "anded" to form the master unblank signal. An X blank (or Y blank) is generated when the sweep crosses the valid/invalid boundary of the display. Either unblank signal will cause the display to be blanked. If the entire line or at least the end portion is within the displayable boundaries, the "sequence blank" will cause the display to be blanked at the end of the line generation sequence.

The mainframe interface 12 is a modified MDB Systems general purpose interface board. The additional circuitry includes a parameter counter/register, line drivers and other miscellaneous logic. The device select decoder is set to decode device $66_8$. Both programmed I/O and data channel circuits are used. The DOA AC, 66 instruction is used to load the parameter counter/register with the contents of the selected accumulator, ACφ through AC3. The DOB AC, 66 instruction transfers the contents of the computer register, AC, to a 16-bit data latch, which is composed of chips 6D, 5D, 4D, and 3D. The DOB pulse serves as the data load pulse in the raster scan unit. The DOC AC, 66 passes the contents (an address) of AC to the address counter of the data channel controller (chips 10E, 9E, 8E and 7E). The preset inputs to the range counter (chips 6C, 5C, 4C and 3C) are permanently wired for a $-10_{10}$ count. The DOC pulse initiates the data channel transfers, loads the range counter and clears the parameter counter. No busy/done or interrupt is associated with the data channel. The data outputted using the data channel is loaded into the data latch. The $\overline{\text{DCHSEL}\cdot\text{DCHO}}$ pulse is used to load the data in the raster scan unit. The $\overline{\text{DCHSEL}\cdot\text{DCHO}}$ pulse is delayed by a one shot to serve as a count-up clock on the parameter counter/register. This automatically steps the parameter number so that the next data channel transfer will be for the next parameter.

The IORST & CLEAR pulses clear "BUSY" and "DONE" and the interrupt request flip-flop. The IORST also clears the interrupt mask flip-flop. (The interrupt mask is bit 6 of the "C-extended" interrupt mask). The "START" pulse initiates the raster sequence. If a DOCS AC, 66 instruction is executed, the "START" pulse is held until the data channel transfers have been completed. The "START" pulse also sets "BUSY" and clears "DONE" and the interrupt request, When the raster is finished, a "DONE" pulse is generated which clears "BUSY", sets "DONE" and generates an interrupt request, conditional upon the interrupt mask.

The programming of the raster scan unit is straight forward and simple. The raster scan unit parameters can be loaded either by programmed I/O (using DOA and DOB sequences) or by data channel. The DOA instruction is used to set the parameter number (ϕ through $11_8$), and the DOB instruction is used to transmit the data for that parameter number. Any or all parameters can be changed via programmed outputs. If the data channel is used to load the parameters all parameters must be specified in a sequential table in addressable core. The address of the first entry is passed to the address counter using the DOC instruction. If a "START" pulse occurs with the DOC instruction, the raster scan unit will commence raster generation at the completion of the data channel transfers. The "BUSY"/"DONE" and interrupt are handled in the usual manner.

As previously stated, there are ten steps (0 through 9) in the generation of a single raster. The step counter is set to "0" with the start pulse and sequencing through the remaining steps is automatic and determined by various tests on conditions within each step. The steps are as follows, it being assumed that the raster variables have been loaded previously and that a "START" has been issued:

STEP "0"

(1) Set FRAME=0

(2) Set interlace counter (INTRLCNTR)=1 (interlace bit On/Off)

(3) Calculate the number of strokes; load the "N" register, decrement the "N" register (=N')

(4) Increment step counter

STEP "1"

(1) Calculate the number of lines for this frame (L') using $L'=2^{-I}*[L+(1\cdot\overline{\text{FRAME}}]$ where L=total number of lines for the raster (2) Decrement L' register—(if L'=−1 set step counter=9)

(3) Set FIRST LINE OF FRAME (FLOF)=1

(4) Load the X-start ($X_s$), Y-start ($Y_s$) and θ start ($\theta_s$) accumulators with $X_o$, $Y_o$, $\theta_o$ respectively (5) If FRAME=1, add ΔX, ΔY, Δθ to the $X_s$, $Y_s$, $\theta_s$ accumulators respectively (6) Increment step counter

STEP "2"

(1) Calculate the starting position and angle of the next line using $$X_s=X_s+[2^{I}*(\Delta X\cdot\overline{\text{FLOF}})]$$

$$Y_s=Y_s+[2^{I}*(\Delta Y\cdot\overline{\text{FLOF}})]$$

where

I=interlace bit (On/Off)

$$\theta_s=\theta_s+[2^{I}*(\Delta\theta\cdot\overline{\text{FLOF}})]$$

(2) Calculate δx & δy (δx & δy are the components of the stroke increments) using $$\delta x=(K_v+32)*(C'\cos\theta_s)$$

$$\delta y=(K_v+32)*(C'*\sin\theta_s)$$

NOTE: (C'* cos $\theta_s$) & (C'* sin $\theta_s$ are values stored in a PROM table, single quadrant lookup. The accumulator board has logic to take care of the sign of each quadrant for the sin/cos lookup.

(3) Load the X,Y accumulators with $X_s$,$Y_s$ (4) Load the $X_{out}$,$Y_{out}$ registers with $X_s$,$Y_s$ (5) Time out retrace delay (6) Increment step counter

STEP 3

(1) Back-up one stroke (generate SUB δx-δy pulse) using $$X=X-\delta x$$

and $$Y=Y-\delta y$$

(2) Wait 300 ns (3) Load $X_{out}$,$Y_{out}$ register with X,Y (4) Back-up another stroke (5) Wait 300 ns (6) Increment step counter

STEP 4

(1) Load $X_{out}$,$Y_{out}$ register with X,Y (2) Advance one stroke using $$X=X+\delta x$$

and $$Y=Y+\delta y$$

(3) Wait 300 ns (4) Load $X_{out}$,$Y_{out}$ register with X,Y (5) Advance one stroke (6) Wait 300 ns (7) Load stroke reg. with N' and generate sequence unblank (SEQUNBLNK)

(8) Increment step counter

STEP 5

(1) Load $X_{out}$,$Y_{out}$ register with X,Y (2) Advance one stroke (3) Wait 300 ns (4) Decrement N' register (5) Repeat Step 5 if $N' \neq -1$, else increment step counter ($N' = -1$)

STEP 6

(1) Load $X_{out}$,$Y_{out}$ registers with X,Y and generate sequence (SEQBLNK) blank
(2) Advance one stroke
(3) Wait 300 ns
(4) Load $X_{out}$,$Y_{out}$ register with X,Y
(5) Wait 300 ns
(6) Load $X_{out}$,$Y_{out}$ registers with X,Y
(7) Increment step counter

STEP 7

(1) Set FLOF=0
(2) Decrement L' register—if $L' \neq -1$ go to STEP 2, else continue
(3) Increment step counter

STEP 8

(1) Decrement interlace counter
if=0 set FRAME=1 and go to STEP 1
if=−1 increment step counter

STEP 9

(1) Generate "DONE" pulse and terminate raster
NOTE: In the manual/continuous mode, the trailing edge of the "DONE" pulse generates another start pulse and the raster sequences is reinitiated at step "0".

Figure 2:
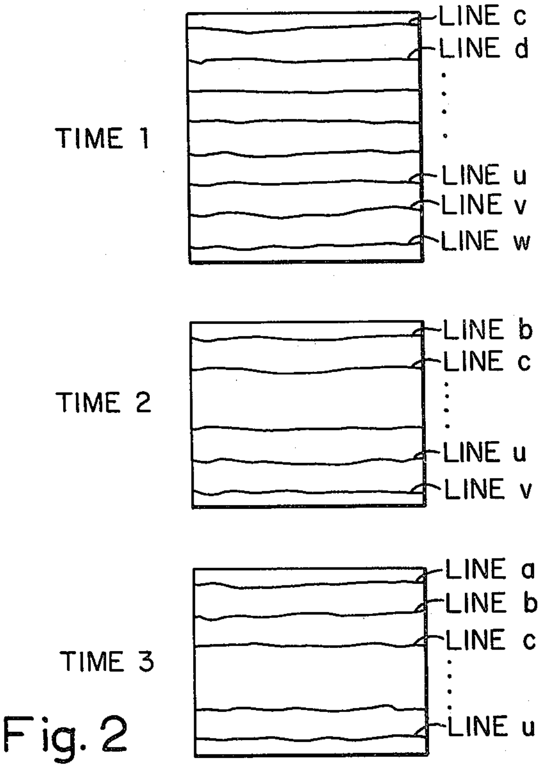
FIG. 2 is a diagram showing one type of scan pattern generated by the present invention.
Figure 3:
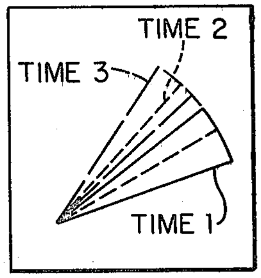
FIG. 3 is a diagram showing another scan pattern generated by the present invention.

By varying the ten parameters which are necessary to specify any one raster, various scan patterns can be generated. For example, in FIG. 2 of the drawing there is a "waterfall" type of scan wherein oldest data occupying the lowest line on the raster is pushed down off the raster by the entry of a new data line at the top of the raster. Actually, the waterfall is produced by video inputs which are in synchronization with the raster. In FIG. 3 of the drawing, there is shown a "Wheel of fortune" type of scan wherein $\Delta x$ and $\Delta y$ are held at zero and $\Delta\theta$ is held constant to produce the effect of a wedge rotating about its vertex.

Obviously many modifications and variations of the present invention are possible in the light of the above teachings. It is therefore to be understood that the invention may be practiced otherwise than as specifically described.

I claim:

1. A raster scan generator of the type receiving instructions from an external source and for generating different formats of rasters for a plan view display comprising, interface means connected with an external source for receiving parameters for raster patterns, an angle accumulator connected with said interface means for computing angles of rotation for successive lines of a raster pattern, and providing incremental horizontal and vertical values for generating each line of a raster pattern, position accumulator means connected with said angle accumulator for calculating the starting position of each raster line, for computing the position sweep of each raster line and for generating a blanking signal for said plan view display, and time means generating timing and sequencing signals for generating each raster line.

2. A raster scan generator of the type receiving instructions from an external source and for generating different formats of rasters for a plan view display as set forth in claim 1 wherein said position accumulator means includes a horizontal accumulator and a vertical accumulator for calculating the starting position of each raster line and for computing the position sweep for each raster line.

3. A raster scan generator of the type receiving instructions from an external source and for generating different formats of rasters for a plan view display as set forth in claim 1 having switching means for selectively connecting said raster scan generator to an external computer and an external control panel.

4. A method of generating different formats of rasters for a plan view display from data received from an external source comprising the steps of, computing the angle of rotation of successive lines in a raster and calculating the incremental change of horizontal and vertical values used to generate each line in a raster, and then generating the starting position of each raster line by adding the incremental changes of horizontal and vertical values to starting values received from said external source.

5. A method of generating different formats of rasters for a plan view display from data received from an external source as set forth in claim 4 including the step of blanking the display at the beginning of each raster line.

6. A method of generating different formats of rasters for a plan view display from data received from an external source as set forth in claim 4 wherein the step of computing the angle of rotation of successive lines in a raster and calculating the incremental changes of horizontal and vertical values used to generate each line includes the step of using outputs from an angle computer as an address to a sine/cosine lookup table.

* * * * *